United States Patent
Haug

Patent Number: 5,497,300
Date of Patent: Mar. 5, 1996

[54] HEADLIGHT FOR VEHICLES

[75] Inventor: Kurt Haug, Reutlingen, Germany

[73] Assignee: Robert Bosch GmbH, Stuttgart, Germany

[21] Appl. No.: 298,228

[22] Filed: Aug. 29, 1994

[30] Foreign Application Priority Data

Sep. 30, 1993 [DE] Germany .................... 43 33 297.8

[51] Int. Cl.⁶ ...................................... B60Q 1/04
[52] U.S. Cl. .................. 362/66; 362/289; 362/428
[58] Field of Search ............................. 362/66, 69, 271, 362/273, 287, 289, 418, 422, 429, 428

[56] References Cited

U.S. PATENT DOCUMENTS 5,068,769  11/1991  Umeda et al. .
5,091,829   2/1992  Hendrischk et al. ............ 362/273
5,388,036   2/1995  Stoppelkamp ..................... 362/66

*Primary Examiner*—Ira S. Lazarus
*Assistant Examiner*—Y. Quach
*Attorney, Agent, or Firm*—Michael J. Striker

[57] ABSTRACT

A headlight for a vehicle comprises a reflector, a holder with which the reflector is displaceably connected, at least one displacing device for displacing the reflector relative to the holder, the displacing device having an adjusting element for its actuation and extending outwardly beyond the holder and also being provided with a toothing, an indicating device which indicates a deviation of an adjustment of the reflector from a predetermined nominal adjustment and having a toothed wheel which engages with the toothing of the adjusting element, the toothed wheel of the indicating device having an end surface provided with a spiral-shaped groove, and a slider engaging in the groove and displaceably guided in a receptacle in a structural element which is stationary relative to the toothed wheel and indicating the adjustment of the reflector from the nominal adjustment.

11 Claims, 2 Drawing Sheets

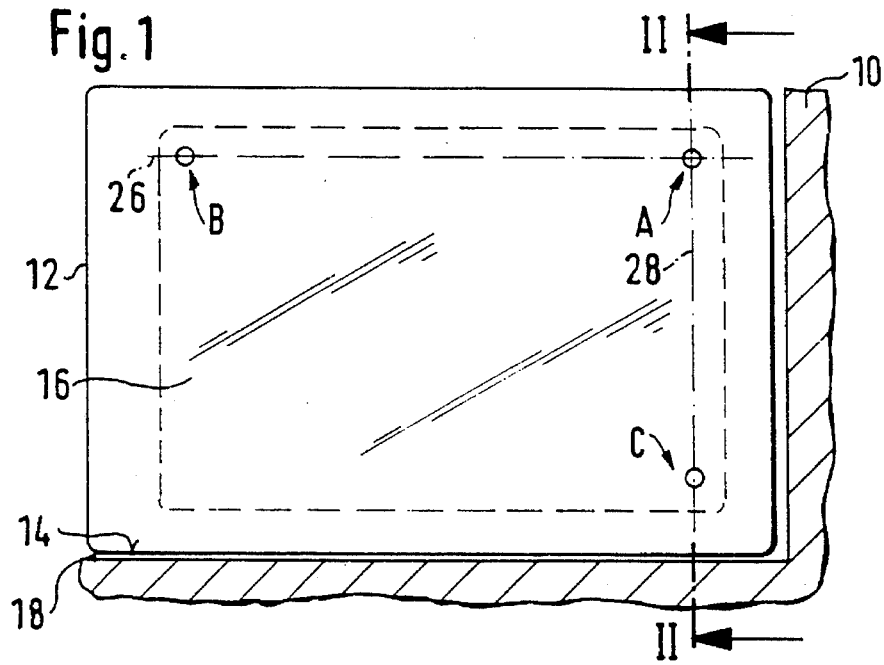
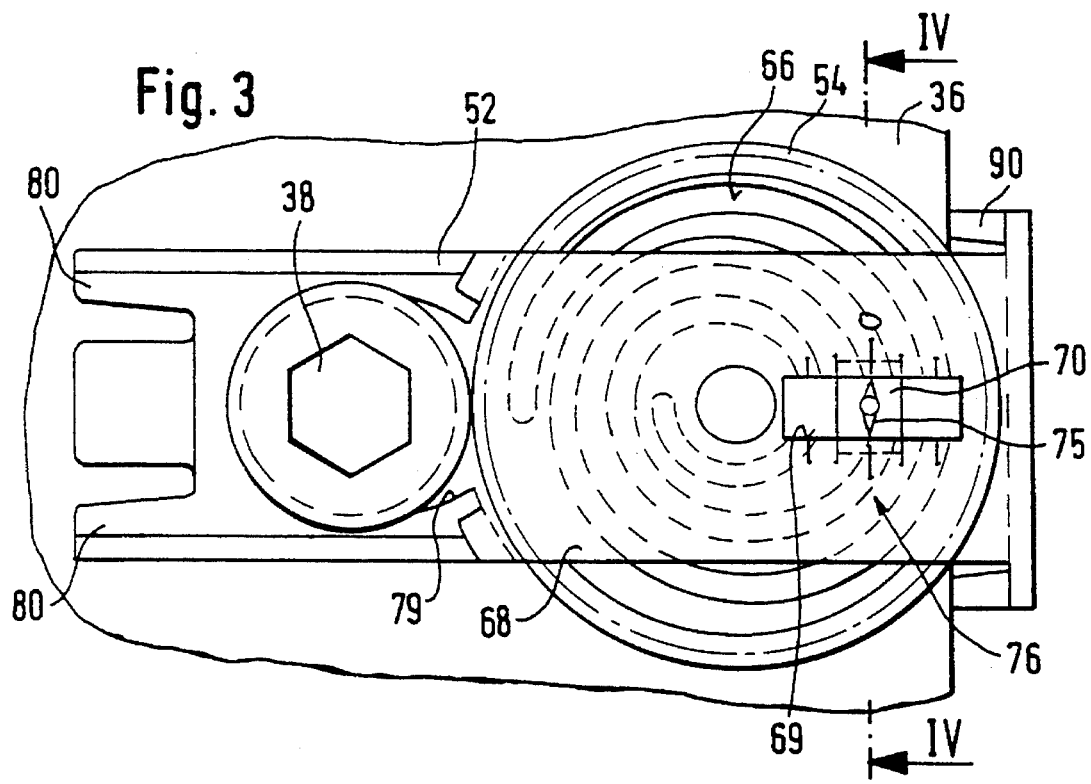
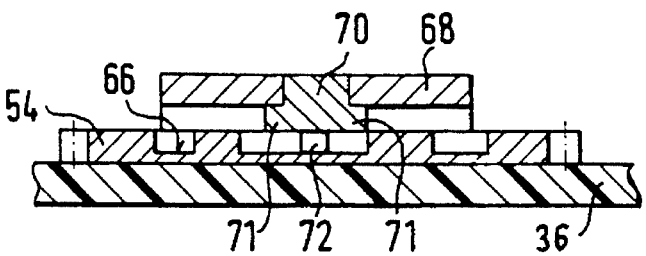

HEADLIGHT FOR VEHICLES

BACKGROUND OF THE INVENTION

The present invention relates to a headlight for vehicles.

More particularly, it relates to a headlight which has a reflector adjustably connected with a holder and displaceable relative to the latter by an adjusting device through an outwardly extending adjusting element.

Headlights of the above mentioned general type are known in the art. One of such headlights is disclosed in the U.S. Pat. No. 5,068,769. The headlight has a reflector which is adjustably connected with a holder, and the holder is formed as a supporting frame. For an adjustment of the reflector relative to the holder, an adjusting device is provided which has an adjusting element formed as an adjusting screw. The adjusting screw is rotatably guided in the supporting frame and is axially non-displaceable, and it is screwed in a threaded portion of the reflector. During turning of the adjusting screw the distance between the reflector and the supporting frame and thereby the adjustment of the reflector is changed. The adjusting screw has a portion extending outwardly beyond the supporting frame and carrying a toothed wheel. Moreover, an indicating device is provided in the headlight and indicates a deviation of the adjustment of the reflector for a predetermined nominal adjustment. The indicating device has a toothed wheel which engages with the toothed wheel of the adjusting screw and is provided in its periphery with a marking. The toothed wheels of the adjusting screw and the indicating device form a reducing transmission, so that the toothed wheel of the indicating device during rotation of the adjusting screw rotates slower than the adjusting screw. The toothed wheel of the indicating device is provided on its periphery with a marking which cooperates with a scale arranged on the supporting frame. During turning of the adjusting screw the toothed wheel of the indicating device is turned by the toothed wheel of the adjusting screw and by the adjustment of the marking of the toothed wheel of the indicating device eventually available deviation of the adjustment of the reflector from the nominal adjustment provided by the scale is indicated. By means of this indicating device, the reflector can be correctly adjusted.

For providing a fine adjustment of the reflector, the thread of the adjusting screw has a small pitch. This means that during a displacement of the reflector in certain conditions many revolutions of the adjusting screw are needed. For satisfying the requirements of corresponding regulations, the deviations must be readable to a certain degree on the indicating device. It is difficult to represent the great adjusting region of the reflector on the indicating device, since for this purpose a substantial reduction ratio must be provided between the toothed wheel of the adjusting screw and the toothed wheel of the indicating device. For this purpose the toothed wheel of the indicating device must be very big, which means that the indicating device needs a great mounting space.

SUMMARY OF THE INVENTION

Accordingly, it is an object of the present invention to provide a headlight for vehicles, which avoids the disadvantages of the prior art.

In keeping with these objects and with others which will become apparent hereinafter, one feature of the present invention resides, briefly stated, in a headlight of the above mentioned type in which the toothed wheel of the indicating device is provided with a spiral shaped groove in an end surface, and a slider engages in the groove and is displaceably guided in a receptacle in a structural element which is stationary relative to the toothed wheel of the indicating device and indicates the deviation of the adjustment of the reflector relative to the nominal adjustment.

When the headlight is designed in accordance with the present invention it has the advantage that due to the further reduction provided between the spiral shaped groove and the indicating element of the indicating device relative to the adjusting element, a greater adjusting region of the reflector can be indicated by the indicating device with simultaneous compact construction of the indicating device.

In accordance with a further advantageous feature of the present invention, the adjusting element extends outwardly beyond the upwardly facing wall of the holder in a mounting condition of the headlight in the vehicle, and the slider of the indicating device is visible from above the holder. With this arrangement of the indicating device on the upper side of the holder, it is easily observable in the mounting position on the headlight.

In accordance with a further advantageous feature of the present invention, the indicating device has a toothed wheel and the slider has a support which receives the same and is releasably mounted on the holder. In this construction the indicating device in a support part is especially simply mountable on the holder.

Still another feature of the present invention is that the slider has a projection engaging into the groove, which is formed so that it is elastically deformable transversely to the groove and engages in the groove under elastic deformation. With this construction a special connection between the slider and the groove in the toothed wheel is provided, so that the indicating device has a high accuracy.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a front view of a headlight for a vehicle in accordance with the present invention in a simplified illustration;

FIG. 3 is a view from the above of the inventive headlight as seen in FIG. 2; and FIG. 4 is a view showing a section of the inventive headlight taken along the line IV—IV in FIG. 3.

DESCRIPTION OF THE PREFERRED EMBODIMENTS

Figure 2:
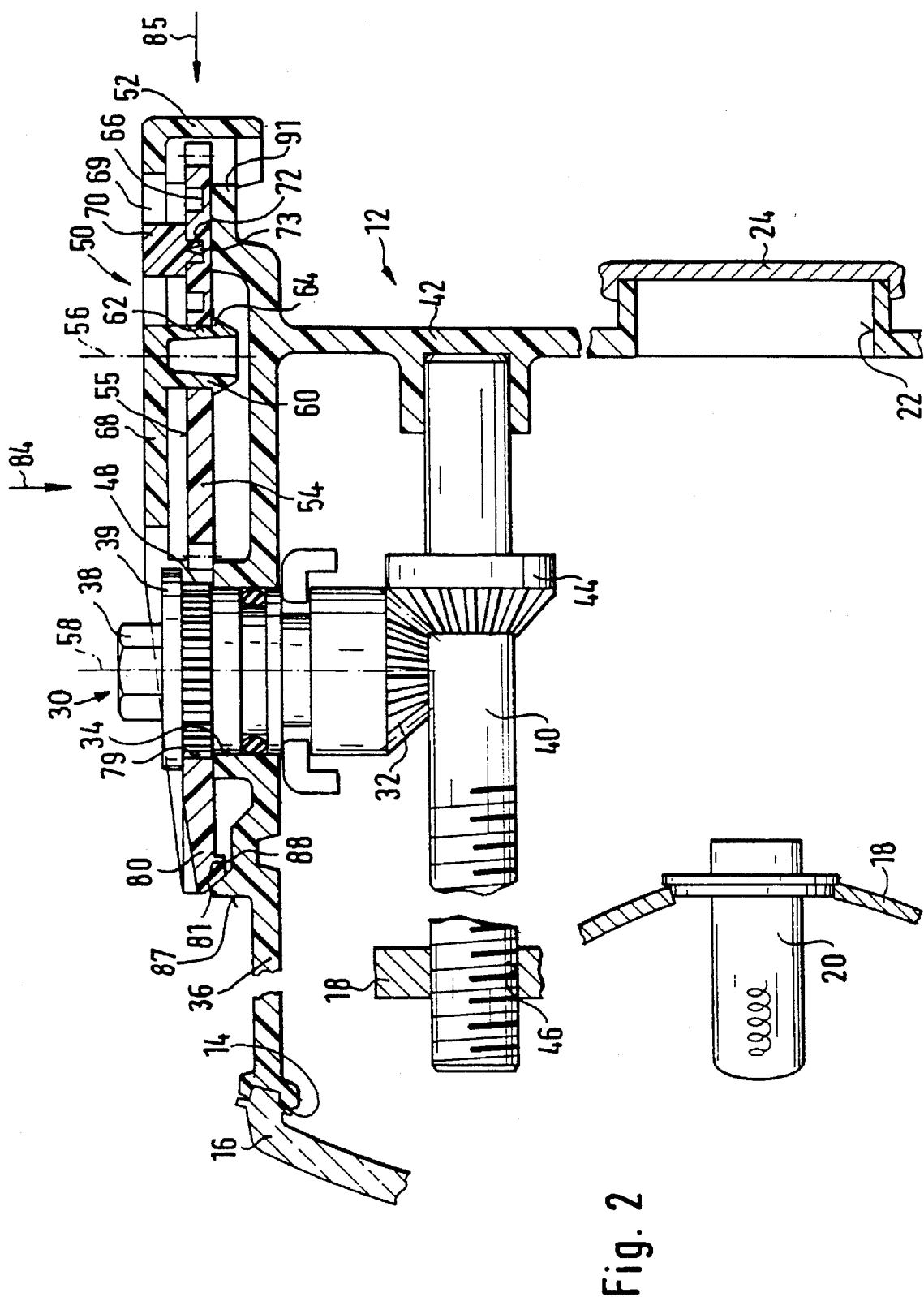
FIG. 2 is a view showing a vertical longitudinal section of the inventive headlight taken along the line II—II in FIG. 1.

A headlight for a vehicle, in particular a motor vehicle, shown in FIGS. 1–4 is mounted on a chassis 10 of the vehicle. The headlight has a holder 12 shown in FIG. 2 and mounted on the chassis. In the shown embodiment the holder 12 is formed as a housing provided with an opening 14 at its front side which faces in direction of the light exiting the headlight. The opening 14 is closed by transparent cover disc 16 mounted on the front edge of the housing 12. A reflector 18 is arranged in the housing 12, and a light source 20 is received in the reflector. The housing 12 at its rear side is provided with an opening 22 through which the light source 20 is accessible and which is closeable by a cap 24. The reflector 18 is displaceably connected with the housing 12 for adjusting the reflector 18 relative to the housing 12. In accordance with another embodiment of the headlight, it is also possible to form the holder 12 as a supporting frame on which the reflector 18 is displaceably held. In this case the transparent cover disc 16 is mounted on the front edge of the reflector 18 and is displaceable together with the reflector.

The reflector 18 is shown for example in FIG. 1. It is connected with the housing 12 by three bearing points A, B and C. Two of the bearing points determine an axis on which the reflector 18 is turnable for its adjustment. Therefore two bearings points A and B are available which is arranged horizontally near one another and determine a horizontal turning axis 26 of the reflector 18, while two bearings A and C which are arranged vertically over one another determine a vertical turning axis 28 of the reflector 18. The bearing point A forms a so-called fixed bearing, on which no displacement of the reflector 18 is possible, while both other bearing points B and C form so-called displacement bearings associated with a displacement device for providing a distance between the reflector 18 and the housing 12 in the region of the bearing point B or C and therefore for activating a turning movement of the reflector 18 around the turning axes 26 and 28. For adjusting the reflector 18 in a vertical plane, it is turned about the horizontal turning axis 26 by an actuation of a displacing device associated with the bearing point C. For adjusting the reflector in a horizontal plane the reflector is turned by actuation of the displacing device associated with the bearing point B around the vertical turning axis 28.

FIG. 2 illustrates a displacing device which is associated at least with the bearing point B or C. The displacing device has an adjusting element 30 including a bevel toothed wheel 32 arranged inside the housing 12 and an actuating portion 38 which extends through an opening 34 in an upwardly located wall 36 of the housing 12 in the mounting position of the headlight on the vehicle chassis. The adjusting element 30 is turnable in the opening 30, however, is not displaceable along its longitudinal axis. The actuating portion 38 of the adjusting element 30 can be formed for example as an outer or inner hexagon, a cross-shaped slot, or a transverse slot or another shaped profile for placing a tool for its turning. An adjusting screw 40 is arranged inside the housing 12 and is supported for example in a rear wall 42 of the housing 12. It is rotatable but not displaceable along the longitudinal axis in the housing 12. The adjusting screw 40 has a toothed wheel portion 44 with a conical toothed wheel, which engages with the conical toothed wheel 32. The adjusting screw 40 is screwed with its threaded shaft into a threaded opening 46 arranged on the reflector 18. During rotation of the adjusting element 30, the adjusting screw 40 is turned through its conical toothed wheel 32 and toothed wheel portion 44, and as a result, the reflector 18 is moved along the longitudinal axis of the adjusting screw 40 on its threaded shaft and the distance between the reflector 18 and the housing 12 is changed.

The actuating portion 38 of the adjusting element 30 which extends outwardly beyond the housing 12 is provided on its periphery with a toothing 48, and the toothing 48 extends only over part of the length of the actuating portion 38. After the toothing 48, a flange 39 is formed on the actuating portion 38 at the side facing away from the bevel toothed wheel 32. The flange 39 has a greater diameter than the diameter of the region of the actuating portion 38 provided with the toothing 48.

An indicating device 50 is mountable on the housing 12 and has a structural element formed as a support 52 for rotatably receiving a toothed wheel 54. The toothed wheel 54 is rotatable about an axis 56 extending parallel to the rotary axis 58 of the adjusting element 30 and has a greater diameter and thereby a greater number of teeth than the toothing 48 of the adjusting element 30. The support 52 has a bearing pin 60 for the toothed wheel 54, which is slotted in a longitudinal direction for providing a radial elasticity, and the toothed wheel 54 with its opening 62 is displaced on it. The pin 60 is provided at its free end with a radially outwardly extending, circumferential projection 64. The toothed wheel 54 engages in its end position on the support 52 behind the projection 64 and thereby is held on the support 52 in direction of the rotary axis 56. The toothed wheel 54 extends laterally beyond the support 52 as shown in FIG. 3. The support is formed for example as an injection molded part of a synthetic plastic material. The toothed wheel 54 can also be composed of a synthetic plastic material, however, it can also formed of metal.

The end surface 55 of the toothed wheel 54 which faces upwardly in the mounted position of the indicating device 50 on the housing 12 of the headlight, is provided with a spiral shaped groove 66 with respect to the rotary axis 56. The spiral groove 66 has one or several spiral convolutions between the outer periphery of the toothed wheel 54 and its rotary axis 56. The end surface 55 of the toothed wheel 54 extends perpendicularly to its rotary axis 56 and outside of the groove 66 is formed substantially flat. In the shown embodiment three spiral convolutions are provided. The support 52 has a cover-shaped portion 68 which overlaps the end surface 55 of the toothed wheel 54 which contains the groove 66. A receptacle formed as a slot 69 is provided in the portion 68, and a slider 70 is displaceably guided in it. The slider 70, as shown in FIG. 4, has laterally two strips 71 which are wider than the region arranged in the slot 69, and is guided with its strips 71 between the toothed wheel 54 and the cover 68. The slider 70 has a projection 72 engaging in the groove 66 of the toothed wheel 54 with a play which is as little as possible transverse to the groove 66. The projection 72 can have for example a slot 73 extending transverse to a displacement direction of the slider 70 in the slot 69, so that the projection 72 can be elastically compressed in the displacement direction. During insertion of the projection 72 in the groove 66 it is somewhat elastically compressed and then guided in the groove 66 play free in the displacement direction of the slider 70. The slot 69 in the cover 68 of the support 52 extends in a radial direction relative to the rotary axis 56 of the toothed wheel 54. The slider 70 can perform in the slot 69 only a radial movement components actuated by the groove 66, however, it does not rotate together with the toothed wheel 54. The slider 70 is provided on its upper side with a marking 75, formed for example as an arrow. A scale 76 is arranged along the edge of the slot 69 in the cover 68 of the support 52. The support 52, in addition to the toothed wheel 54, has a bracket shaped portion provided with an opening 79. The opening 79 is formed as an elongated hole. In the end region located opposite to the indicating device 50, the support 52 has two arresting arms 80 which are elastically turnable and provided on their free ends with a projection 81 correspondingly.

The mounting and operation of the indicating device 50 is explained hereinbelow. First the indicating device 50 is mounted on the support 52, by inserting the toothed wheel 54 and the slider 70. The slider 70 is brought to a position in which its marking 75 indicates the central and in particular the upwardly projecting line on the scale 76. In this position of the slider 70 the indicating device 50 is placed from above in direction of the arrow 84 in FIG. 2 onto the housing 12 of the headlight, and the adjusting element 30 extends through the longitudinal opening 79, so that the bevel toothed gear 32 is inserted into the housing 12 and engages in the toothed wheel portion 44 of the adjusting screw 40. The actuating portion 38 abuts in its end position in the insertion direction of arrow 84 with the flange 39 against the support 52. The toothing 48 of the actuating portion 38 in this end position is arranged between the flange 39 and the outer side of the upper housing wall 36 in the longitudinal opening 79 and located in this end position of the support 52 so that it does not engage with the toothed wheel 54 of the indicating device 50. In this position the indicating device 50 is shown in FIGS. 2 and 3. When an optical basic adjustment is performed for the headlight, or in other words it is checked whether the light bundle emitted by it has a predetermined direction. When it is not so, then during turning of the adjusting element 30 a displacing device is activated until the light bundle emitted by the headlight assumes the prescribed direction. In this position of the adjusting element 30 the support 52 is displaced with the indicating device 50 horizontally in the arrow direction 85 in FIG. 2, and the actuating portion 38 slides in the longitudinal opening 79 until its toothing 48 engages with the toothed wheel 54. In this end position of the support 52 on the headlight housing 12, the arresting arms 80 engage with their projections 81 behind an outwardly extending shoulder 87 on the upper wall 36 of the headlight housing 12. The shoulder 87 is arranged on the wall 36 opposite to the ramp 88 upwardly extending in the displacement direction 85 of the support 52, and the arresting arms 80 slide on the ramp so that an easy engagement of the arresting arms is obtained. The support 52 is held in its end position between the flange 39 of the actuating portion 38 and by the arresting arms 80. In addition, the support 52 on its end facing away from the arresting arms 80 can be provided as shown in FIG. 3 with at least one hook 90 which is U-shaped and faces with its free end in the displacement direction of the arrow 85 of the support 52. The hook 90 engages a wall 91 which projects from the housing 12 parallel to the displacement direction of the support 52 and represents an additional holding element of the support 52.

During the operation of the vehicle, due to vibrations or other actions, a displacement of the reflector 18 can occur, and the light bundle emitted by the headlight no longer assumes the direction prescribed in accordance with regulations. Because of the connection of the indicating device 50 with the adjusting element 30, this deviation shows the displacement of the reflector 18 from the prescribed displacement. By turning of the adjusting element 30, the toothed wheel 54 of the indicating device 50 is turned through the toothing 48, and the rotary angle of the toothed wheel 54 due to the reduction relative to the toothing 48 of the adjusting element 30 is substantially smaller than the rotary angle of the adjusting element 30. The adjusting element 30 can perform several revolutions until the toothed wheel 54 performs one revolution. The reduction ratio between the toothing 48 and the tooth wheel 54 is selected advantageously so that the toothed wheel 54 is not too big in order to maintain the size of the indicating device as small as possible. During a rotation of the toothed wheel 54, the slider 70 performs a rectilinear movement in the slot 69, and due to the spiral-shaped groove 66 between the slider 70 and the toothed wheel 54 a further reduction is actuated, or in other words, axial displacement of the slider 70 during rotation of the toothed wheel 54 is small. The more convolutions the spiral-shaped groove 66 has, the greater is the reduction between the toothed wheel 54 and the slider 70. In the shown embodiment the groove 66 has three spiral convolutions, so that the toothed wheel 54 starting from its premounted condition can perform one half turn in each rotary direction. Due to the double reduction of the movement of the slider 70 relative to the rotation of the adjusting element 30 actuated between the toothing 48 and the toothed wheel 54 on the one hand and the toothed wheel 54 and the slider 70 on the other hand, the slider 70 together with the scale 76 can indicate a relatively great displacement region of the reflector 18. When the adjustment of the reflector 18 deviates from the prescribed adjustment, the arrow 75 of the slider 70 indicates the not prescribed adjustment, in particular the projecting central line of the scale 70. For adjusting the reflector 18, the adjusting element 30 is turned in the required rotary direction until the arrow 75 of the slider 70 indicates the central line of the scale 76 and the reflector 18 is correctly adjusted.

The above described indicating device 50 can be mounted as a separate unit on the housing 12 of the headlight. It is possible to produce therefore the headlight independently from the indicating device 50, and its suffices to provide on the headlight housing 12 corresponding mounting points for the indicating device 50. The headlight can be then inserted on the vehicle with the indicating device 50 when it is required for the use of the vehicle, as well as without the indicating device when it is not required.

It will be understood that each of the elements described above, or two or more together, may also find a useful application in other types of constructions differing from the types described above.

While the invention has been illustrated and described as embodied in a headlight for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A headlight for a vehicle, comprising a reflector; a holder with which said reflector is displaceably connected; at least one displacing device for displacing said reflector relative to said holder, said displacing device having an adjusting element for its actuation and extending outwardly beyond said holder and also being provided with a toothing; an indicating device which indicates a deviation of an adjustment of said reflector from a predetermined nominal adjustment and having a toothed wheel which engages with said toothing of said adjusting element, said toothed wheel of said indicating device having an end surface provided with a spiral-shaped groove; and a slider engaging in said groove and displaceably guided in a receptacle in a structural element which is stationary relative to said toothed wheel so as to indicate said deviation of the adjustment of said reflector from said nominal adjustment.

2. A headlight as defined in claim 1, wherein said adjusting element in a mounted position of the headlight on the vehicle extends outwardly beyond an upwardly facing wall of said holder, said slider of said indicating device being visible from above said holder.

3. A headlight as defined in claim 1, wherein said structural element is a support which receives said toothed wheel and said slider and is releasably mountable on said holder.

4. A headlight as defined in claim 3, wherein said support is mountable on an outer side of said holder.

5. A headlight as defined in claim 3, wherein said support is mountable by an arresting connection on said holder.

6. A headlight as defined in claim 3, wherein said support is premountable on said holder in a position in which said toothed wheel of said indicating device does not engage with said toothing of said adjusting element, and is mountable in an end position in which said toothed wheel engages with said toothing of said adjusting element.

7. A headlight as defined in claim 1, wherein said structural element is a support provided with said receptacle for said slider.

8. A headlight as defined in claim 1, wherein said receptacle for said slider is formed as a slot.

9. A headlight as defined in claim 8, wherein said slot extends substantially in a radial direction relative to a rotary axis of said toothed wheel of said indicating device.

10. A headlight as defined in claim 1, wherein said slider has a projection engaging in said groove, said projection being elastically deformable and engaging in said groove with elastic deformation.

11. A headlight as defined in claim 1, wherein said slider has a region which is visible through said receptacle and is provided in said region with a marking which cooperates with a scale arranged along said receptacle.

* * * * *